US008892873B1

(12) United States Patent
Souza et al.

(10) Patent No.: US 8,892,873 B1
(45) Date of Patent: Nov. 18, 2014

(54) VERIFICATION OF USER COMMUNICATION ADDRESSES

(75) Inventors: Artur Barbalho de Oliveira Souza, Seattle, WA (US); Rajendra K. Vippagunta, Issaquah, WA (US); Justin Tolmar White, Seattle, WA (US); Tal Elisha Shprecher, Seattle, WA (US); Brendan J. Farrington, Issaquah, WA (US); Jon T. Rogers, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 36 days.

(21) Appl. No.: 13/490,972

(22) Filed: Jun. 7, 2012

(51) Int. Cl.
*H04L 9/32* (2006.01)

(52) U.S. Cl.
USPC ........................................................ 713/162

(58) Field of Classification Search
USPC ........................................................ 713/162
See application file for complete search history.

(56) References Cited

U.S. PATENT DOCUMENTS

| 6,237,093 | B1 * | 5/2001 | Vatanen | 713/162 |
|---|---|---|---|---|
| 6,836,765 | B1 * | 12/2004 | Sussman | 705/75 |
| 6,928,440 | B2 * | 8/2005 | Cordray et al. | 1/1 |
| 6,983,273 | B2 * | 1/2006 | Banerjee et al. | 1/1 |
| 7,082,532 | B1 * | 7/2006 | Vick et al. | 713/155 |
| 8,046,578 | B1 * | 10/2011 | Trudeau et al. | 713/154 |
| 8,145,537 | B2 * | 3/2012 | Wehmann et al. | 705/26.1 |
| 2002/0087465 | A1 * | 7/2002 | Ganesan et al. | 705/39 |
| 2002/0124087 | A1 * | 9/2002 | Asai et al. | 709/226 |
| 2003/0115452 | A1 * | 6/2003 | Sandhu et al. | 713/155 |
| 2005/0015491 | A1 * | 1/2005 | Koeppel | 709/226 |
| 2009/0198997 | A1 * | 8/2009 | Yeap et al. | 713/155 |
| 2009/0313167 | A1 * | 12/2009 | Dujari et al. | 705/43 |
| 2010/0105409 | A1 * | 4/2010 | Agarwal et al. | 455/456.1 |
| 2011/0055412 | A1 * | 3/2011 | Kongalath et al. | 709/228 |
| 2011/0088086 | A1 * | 4/2011 | Swink et al. | 726/7 |
| 2012/0031969 | A1 * | 2/2012 | Hammad | 235/380 |
| 2012/0254407 | A1 * | 10/2012 | Li et al. | 709/224 |
| 2013/0019096 | A1 * | 1/2013 | Palzer et al. | 713/168 |
| 2013/0060689 | A1 * | 3/2013 | Oskolkov et al. | 705/42 |
| 2013/0060708 | A1 * | 3/2013 | Oskolkov et al. | 705/75 |

OTHER PUBLICATIONS

Microsoft, MSDN; Maintaining Session State with Cookies via the Way Back Machine snapshotted Dec. 28, 2010.*

* cited by examiner

*Primary Examiner* — Michael R Vaughan
*Assistant Examiner* — Richard McCoy
(74) *Attorney, Agent, or Firm* — Thomas | Horstemeyer, LLP

(57) ABSTRACT

Disclosed are various embodiments for performing stateless verification of communication addresses. Encrypted verification data is generated for a user, including a communication address, an identifier of the user, a verification code, and a timestamp. The encrypted verification data is sent to the user, and the verification code is transmitted to the communication address. The encrypted verification data and the verification code are received from the user. The communication address is verified based at least in part on the verification code received from the user and the encrypted verification data received from the user.

24 Claims, 5 Drawing Sheets

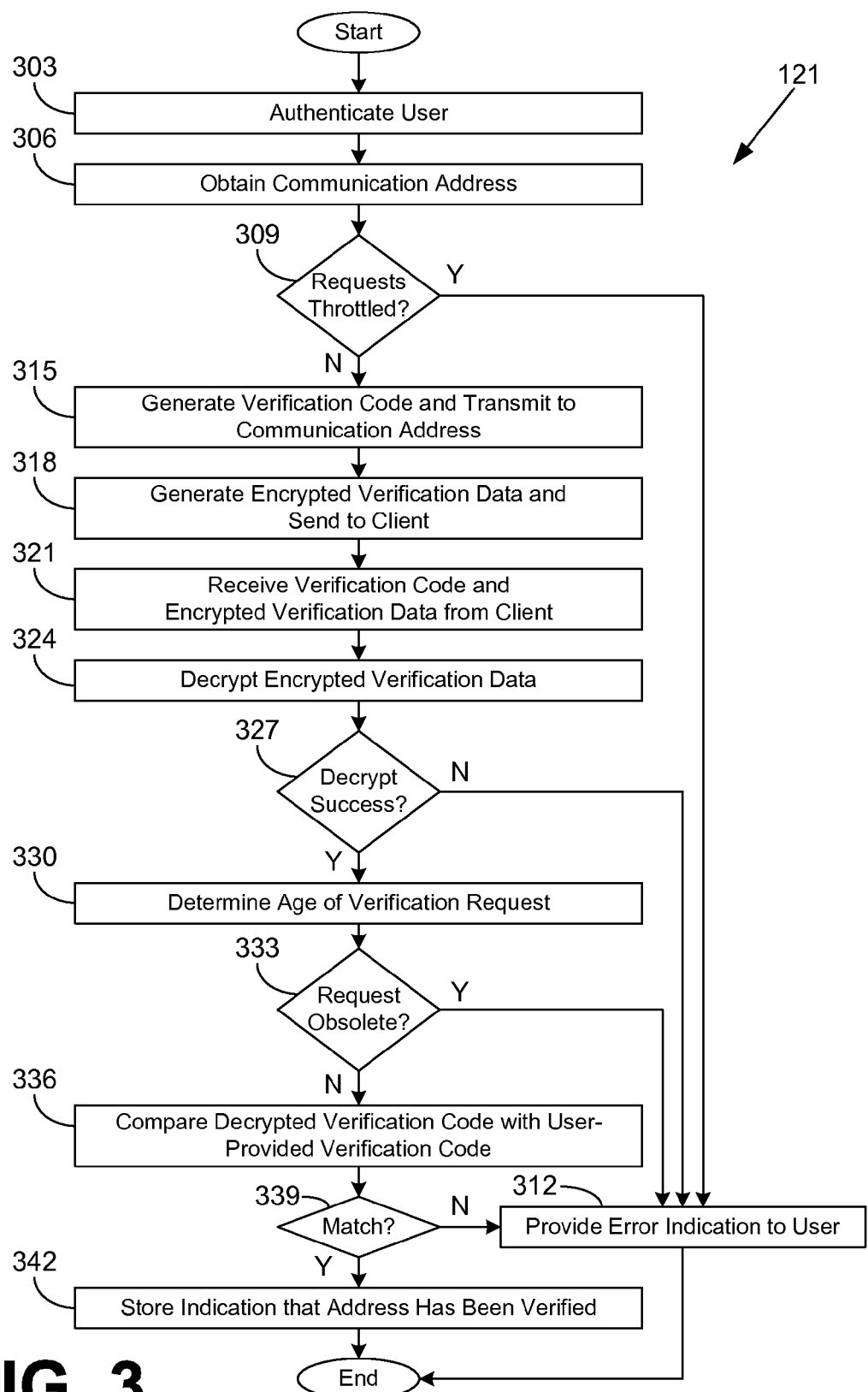

VERIFICATION OF USER COMMUNICATION ADDRESSES

BACKGROUND

An online retailer or other entity may communicate with its customers by various communication channels. For example, the online retailer may originate short message service (SMS) messages to a mobile telephone number of the customer, voice calls to a telephone number of the customer, email messages to an email address of the customer, printed materials to a postal address of the customer, and so on. Without verification that the telephone numbers, email addresses, postal addresses, and/or other addresses have been accurately provided for the customer, notifications or other significant communications intended for the customer may be lost or misdirected.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 3 is a flowchart illustrating one example of functionality implemented as portions of verification application executed in a computing environment in the networked environment of FIG. 1 according to various embodiments of the present disclosure.

DETAILED DESCRIPTION

The present disclosure relates to a stateless verification of communication addresses provided by users. An online retailer or other entity may request communication addresses from users. Such communication addresses may, for example, include phone numbers, email addresses, postal addresses, and so on. Verification is performed to determine that the provided communication address is legitimate and that communication to the user may be performed by way of the communication address. In a sense, ownership by the user of the communication address is established through the verification.

To perform the verification, a verification code is typically sent to the communication address, and the user confirms ownership of the communication address by providing the verification code. A naïve implementation of such a system may involve temporarily storing the verification code and other data at the server in association with the communication address in order for the server to determine whether the communication address is valid. However, such an implementation may result in the storage of a large quantity of temporary data, including data for communication addresses that may never be verified. Also, stale data may need to be periodically cleared, which involves processing resources.

Various embodiments of the present disclosure provide verification of user-provided communication addresses without the need for temporary storage of verification codes or other data at the server side. To this end, encrypted data is provided to a client in response to a communication address being provided. The encrypted data includes the data involved in carrying out the verification. A verification code is transmitted to the communication address. Subsequently, the user provides the verification code and the encrypted data to a server. The server then verifies the communication address based at least in part on the verification code and the encrypted data. The encrypted data need not be persisted in the server, which conserves data storage and processing resources. In the following discussion, a general description of the system and its components is provided, followed by a discussion of the operation of the same.

Figure 1:
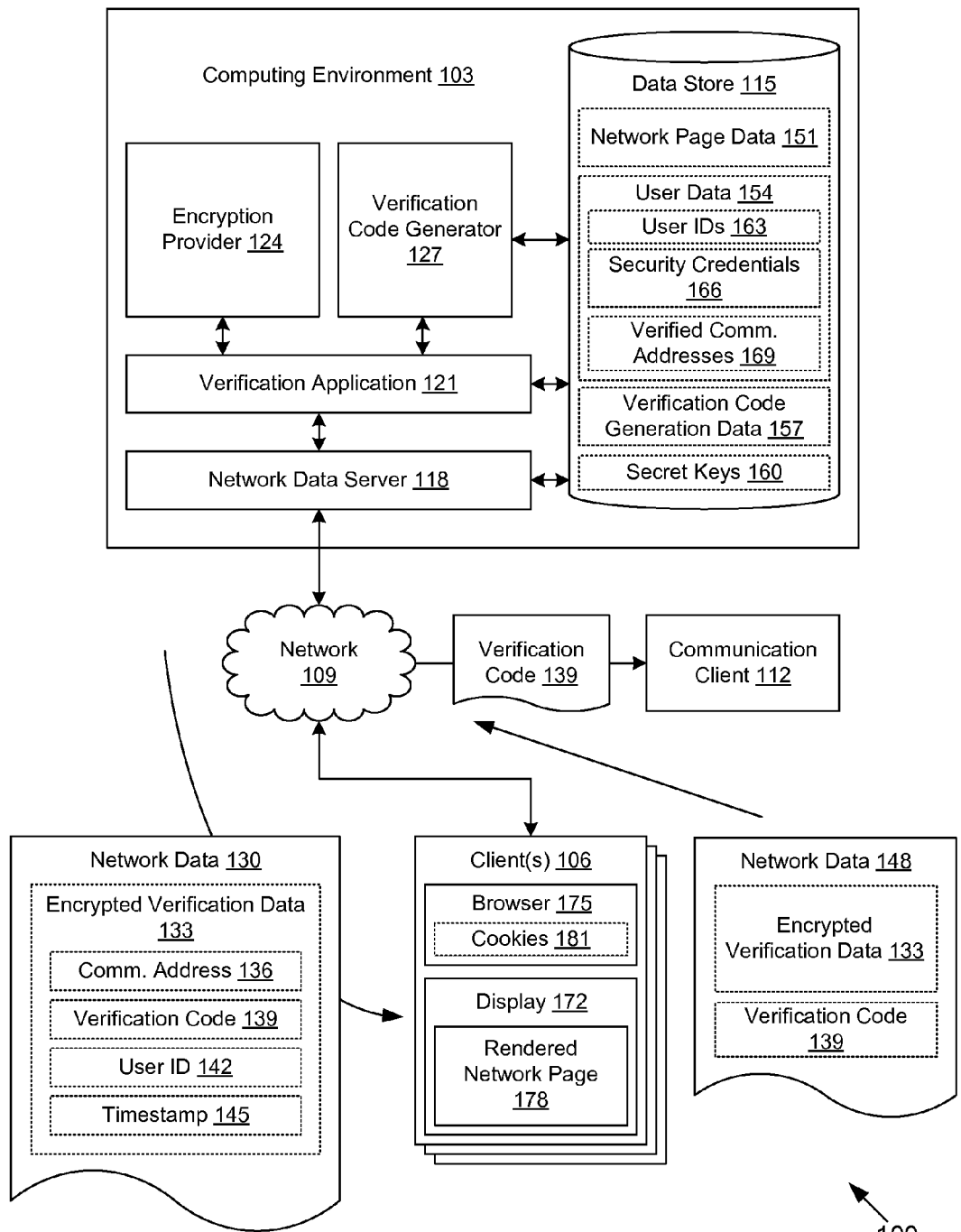
FIG. 1 is a drawing of a networked environment according to various embodiments of the present disclosure.

With reference to FIG. 1, shown is a networked environment 100 according to various embodiments. The networked environment 100 includes a computing environment 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks. The computing environment 103 may also be capable of transmitting a notification to a communication client 112 by way of the network 109. The communication client 112 may correspond to a telephone, smartphone, feature phone, a desktop computer, a laptop computer, personal digital assistants, set-top boxes, music players, web pads, tablet computer systems, game consoles, electronic book readers, or other devices with like capability.

The computing environment 103 may comprise, for example, a server computer or any other system providing computing capability. Alternatively, a plurality of computing devices may be employed that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed on the computing environment 103, for example, include a network data server 118, a verification application 121, an encryption provider 124, a verification code generator 127, and other applications, services, processes, systems, engines, or functionality not discussed in detail herein. The network data server 118 is executed to serve up network pages and/or other forms of network data to the clients 106 by way of the network 109. The network pages may include, for example, web pages, mobile application screens, gopher pages, and/or other forms of network data. The network data server 118 may include a commercially available hypertext transfer protocol (HTTP) server such as, for example, Apache® HTTP Server, Apache® Tomcat®, Microsoft® Internet Information Services (IIS), and so on.

The verification application 121 is executed to generate network pages and/or other data to facilitate receiving and verifying communication addresses for users. Upon receiving a verification request from an authenticated user, the verification application 121 generates network data 130, which includes encrypted verification data 133. The encrypted verification data 133 includes, for example, the communication address 136, the verification code 139, the user identifier 142 for the user, and a timestamp 145 for ensuring timeliness of the verification with respect to the verification request.

The encrypted verification data 133 is sent to the client 106 by way of the network 109. The verification application 121 is also configured to transmit the verification code 139 to a communication client 112 at the communication address as part of the verification process. From the client 106, the verification application 121 receives network data 148, which includes the encrypted verification data 133 previously sent to the client 106 and the verification code 139 previously transmitted to the communication client 112.

The encryption provider 124 is configured to encrypt and decrypt the encrypted verification data 133. The encryption provided by the encryption provider 124 may be relied upon to prevent the user from gaining access to or modifying the contents of the encrypted verification data 133. The verification code generator 127 is configured to generate the verification code 139 from stored data or an algorithmic approach.

The data stored in the data store 115 includes, for example, network page data 151, user data 154, verification code generation data 157, secret keys 160, and potentially other data. The network page data 151 may include code, text, templates, images, graphics, video, audio, animations, and/or other data used in generating network pages to be served up by the network data server 118. The user data 154 includes data associated with users of the system. In one example, the users may be registered customers or prospective customers of an online retailer.

The user data 154 may include, for example, user identifiers 163, security credentials 166, verified communication addresses 169, and/or other data. A user identifier 163 may correspond to a unique identifier for a user. The security credentials 166 may include, for example, usernames, passwords, security questions and responses, keys, and/or other credentials that may be employed to authenticate a user. The verified communication addresses 169 include communication addresses which have previously been verified for the user.

The verification code generation data 157 includes data that may be used by the verification code generator 127 in generating a verification code 139 for a given communication address verification request. To this end, the verification code generation data 157 may correspond to a dictionary of words or phrases that may be modified or used directly for a verification code 139. Alternatively, the verification code generator 127 may be configured to generate the verification code 139 through a random or other algorithmic process. However, words or phrases may be easier to remember or enter by the user.

The secret keys 160 correspond to keys that may be used by the encryption provider 124 to encrypt or decrypt the encrypted verification data 133. The secret keys 160 may correspond to symmetric keys or asymmetric keys. However, it is noted that the user is not given access to the secret keys 160.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 172. The display 172 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 175 and/or other applications. The browser 175 may be executed in a client 106, for example, to access and render network pages, such as web pages, or other network content served up by the computing environment 103 and/or other servers, thereby generating a rendered network page 178 on the display 172. The browser 175 may also be configured to store cookies 181 set by the computing environment 103. The client 106 may be configured to execute applications beyond the browser 175 such as, for example, mobile applications, email applications, instant message applications, and/or other applications.

Next, a general description of the operation of the various components of the networked environment 100 is provided. To begin, a user is authenticated by the verification application 121 by providing a security credential 166 or enrolling as a new user. The user provides one or more communication addresses 136 to the verification application 121. For example, the user may enter a control panel network page or mobile application screen and specify a new telephone number, email address, postal address, etc. to be associated with the account of the user. In one embodiment, the communication address 136 may be preliminarily verified not to belong to another user in the verified communication addresses 169.

The frequency or absolute number of address verification requests by a particular user may be throttled to prevent abuse of the system. For example, the verification application 121 may keep a counter for outstanding address verification requests for the user. In some cases, a timestamp or other tracking data may be persisted in the data store 115 to prevent rapid request origination.

In response to receiving a new, unverified communication address, the verification application 121 generates encrypted verification data 133. To this end, the verification application 121 receives the communication address 136 and the user identifier 142 for the user. The verification application 121 generates a verification code 139 with the verification code generator 127. The verification application 121 also generates a current timestamp 145. The data including the communication address 136, the verification code 139, the user identifier 142, and the timestamp 145 are encrypted into one or more "blobs" by the encryption provider 124 using the secret keys 160 to produce the encrypted verification data 133. It is noted that the computing environment 103 does not persist an association of the communication address 136 with the verification code 139 in memory before the communication address 136 is verified.

In addition, the verification application 121 transmits the verification code 139 to the communication client 112 at the communication address 136. To this end, the verification application 121 may send an email message or text message containing the verification code 139. A text message may be relayed, for example, to a telephone number by a text gateway on the network 109.

In some cases, the communication address 136 may not define a network-reachable communication client 112. As an example, where the communication address 136 is a telephone number, the verification application 121 may place a voice call on the public switched telephone network to the telephone number, where the verification code 139 will be provided during the voice call. As another example, where the communication address 136 is a postal address, the verification application 121 may initiate the generation of materials to be sent by mail to the postal address, where the materials include the verification code 139.

The encrypted verification data 133 is provided by the verification application 121 to the client 106 in the network data 130. The communication client 112 may correspond to the client 106 in some situations. In one embodiment, the verification application 121 may cause the network data server 118 to set a cookie 181 in the browser 175, where the cookie 181 includes the encrypted verification data 133. In another embodiment, the verification application 121 may generate a network page that includes a form. The form may include a prepopulated field that includes the encrypted verification data 133. This prepopulated field may correspond to a hidden field or a user-visible field as desired. The form may be configured to obtain the verification code 139 as received by the user.

Next, the user at the client 106 provides the verification code 139 received through the communication address 136 via a form in the rendered network page 178. Upon submitting the form, the network data 148 is sent to the network data server 118 and on to the verification application 121. The network data 148 includes the encrypted verification data 133 in the form submission or as a cookie 181. The network data 148 also includes the verification code 139 entered by the user, e.g., into a text-input field, or selected via a drop-down box, a radio button, a check box, or other user interface components.

Upon receiving the network data 148, the verification application 121 begins performing the verification of the communication address 136. To this end, the verification application 121 uses the encryption provider 124 to decrypt the encrypted verification data 133. If the encrypted verification data 133 is not present or able to be decrypted, the communication address 136 is not verified. If the contents of the encrypted verification data 133 are successfully extracted, the verification application 121 compares the verification code 139 from the encrypted verification data 133 as a reference against the verification code 139 supplied by the user. If they do not match, the communication address 136 is not verified.

Also, the verification application 121 evaluates the timestamp 145 with respect to a maximum age threshold relative to the current time. It may be desirable to have the verification request have only a brief lifetime, e.g., 30 minutes, an hour, a day, a week, etc. Such a lifetime may be established based on the type of communication address 136 and/or on other factors. Verifying a postal address, for example, may involve a week or more as the request lifetime for the request to allow for delivery and receipt at the postal address. By contrast, a text message may be received near instantaneously, which may weigh towards a lifetime of 30 minutes or less. If the timestamp 145 is too old, the communication address 136 is not verified.

If the maximum age criteria are met and the verification codes 139 match, the communication address 136 may be considered verified. Accordingly, the communication address 136 may be associated with the user identifier 142 in the user data 154 as a verified communication address 169.

Figure 2A:
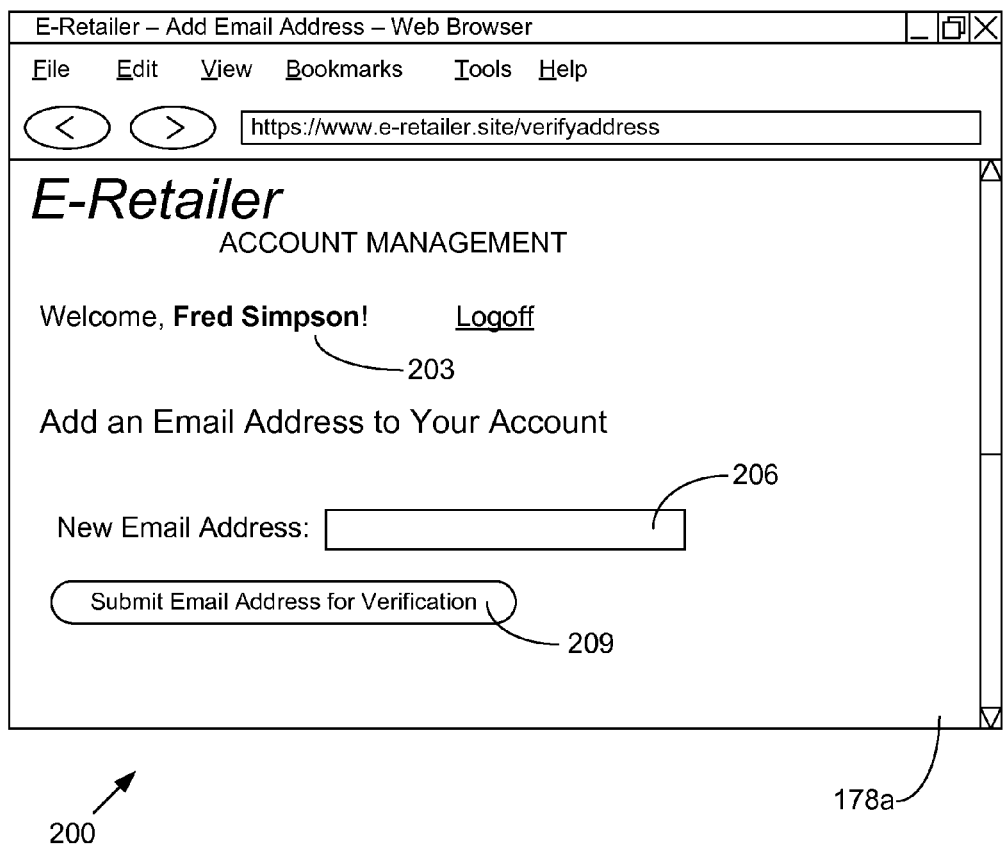
FIGS. 2A and 2B are drawings of example user interfaces rendered by a client in the networked environment of FIG. 1 according to various embodiments of the present disclosure.

Referring next to FIG. 2A, shown is an exemplary user interface 200 rendered in the browser 175 (FIG. 1) executed in the client 106 (FIG. 1) in the networked environment 100 (FIG. 1) according to an embodiment. The user interface 200 includes a rendered network page 178a which allows an authenticated user to specify a communication address 136 (FIG. 1) (in particular, an email address) for verification.

In this non-limiting example, a user indication 203 shows that a user named "Fred Simpson" is currently logged in. In other examples, a user may provide security credentials 166 (FIG. 1) concurrently with a new communication address 136. An address input field 206 is provided for the user to input a new email address for verification. A submit component 209 may be provided for the user to submit the new email address to the server for verification. In other embodiments, a user may select from previously stored communication addresses 136. If only one communication address 136 is available for verification, the user may merely submit a verification request, which in turn implicitly indicates a stored communication address 136 to be verified.

Figure 2B:
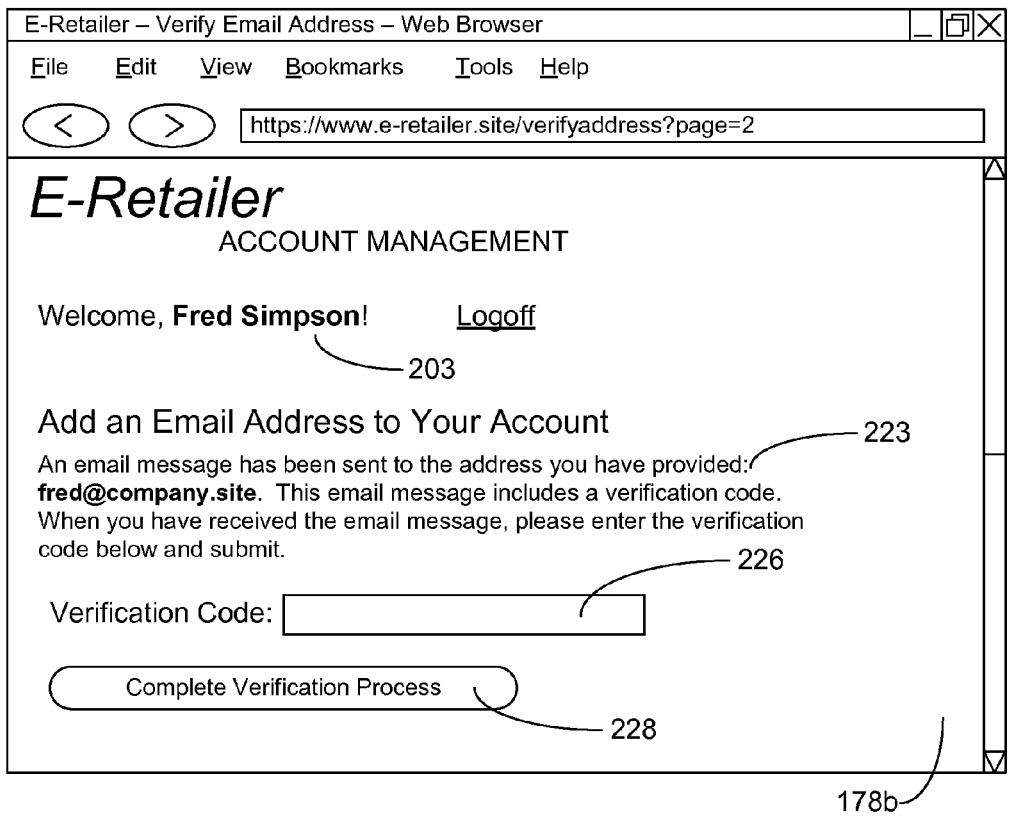

Moving on to FIG. 2B, shown is an exemplary user interface 220 rendered in the browser 175 (FIG. 1) executed in the client 106 (FIG. 1) in the networked environment 100 (FIG. 1) according to an embodiment. The user interface 220 includes a rendered network page 178b which allows an authenticated user to enter a verification code 139 (FIG. 1) that has been sent to the email address provided in the user interface 200 (FIG. 2A).

The rendered network page 178b includes an explanation 223 that an email message has been sent to the provided email address, which in this example is "fred@company.site." The rendered network page 178b also includes a verification code input field 226 for the user to input the verification code 139. The explanation 223 further includes instructions in this regard. The form depicted in FIG. 2B may also include a hidden field having the encrypted verification data 133 (FIG. 1). A submit component 228 may be provided for the user to submit the verification code 139 input by the user along with the encrypted verification data 133. In another example, the encrypted verification data 133 may be provided along with the form as a cookie 181 (FIG. 1).

Referring next to FIG. 3, shown is a flowchart that provides one example of the operation of a portion of the verification application 121 according to various embodiments. It is understood that the flowchart of FIG. 3 provides merely an example of the many different types of functional arrangements that may be employed to implement the operation of the portion of the verification application 121 as described herein. As an alternative, the flowchart of FIG. 3 may be viewed as depicting an example of steps of a method implemented in the computing environment 103 (FIG. 1) according to one or more embodiments.

Beginning with box 303, the verification application 121 authenticates a user at a client 106 (FIG. 1). Alternatively, the user may be a new user who is establishing an account via an enrollment process. In box 306, the verification application 121 receives a communication address 136 (FIG. 1) from the user by way of the client 106. In some cases, multiple communication addresses 136 may be received at once from the user. In other embodiments, the verification application 121 may obtain one or more previously stored communication addresses 136 that may be associated with the user. In box 309, the verification application 121 determines whether the verification requests by the user (or from the client 106) have been throttled for being excessive. If the requests have been throttled for being excessive, the verification application 121 proceeds to box 312 and provides an error indication to the user. Thereafter, the portion of the verification application 121 ends.

If the verification application 121 determines that the verification requests of the user have not been throttled, the verification application 121 proceeds from box 309 to box 315. In box 315, the verification application 121 generates the verification code 139 (FIG. 1) using the verification code generator 127 (FIG. 1) and transmits the verification code 139 to the communication address 136 provided by the user in box 306. The encrypted verification data 133 (FIG. 1) may be encrypted by the encryption provider 124 (FIG. 1) using the secret keys 160 (FIG. 1). In box 318, the verification application 121 generates encrypted verification data 133 and sends it to the client 106. The encrypted verification data 133 may, for example, be set as a cookie 181 (FIG. 1) or encoded in a form in a network page.

In box 321, the verification application 121 receives the verification code 139 as input by the user and the encrypted verification data 133 from the client 106. In box 324, the verification application 121 decrypts the encrypted verification data 133 provided by the client 106 using the encryption provider 124, which uses the secret keys 160. In box 327, the verification application 121 determines whether the decryption has been successful. If the decryption was not successful, the verification application 121 proceeds to box 312 and provides an error indication to the user. Thereafter, the portion of the verification application 121 ends.

If the decryption was successful, the verification application 121 moves from box 327 to box 330. In box 330, the verification application 121 determines the age of the verification request using the decrypted timestamp 145 (FIG. 1). In box 333, the verification application 121 determines whether the request is obsolete with reference to a maximum age threshold. If the request is obsolete, the verification application 121 proceeds to box 312 and provides an error indication to the user. Thereafter, the portion of the verification application 121 ends.

If the request is not obsolete, the verification application 121 continues from box 333 to box 336. In box 336, the verification application 121 compares the decrypted verification code 139 with the user-provided verification code 139. In box 339, the verification application 121 determines whether the decrypted verification code 139 matches the user-provided verification code 139. If they do not match, the verification application 121 proceeds to box 312 and provides an error indication to the user. Thereafter, the portion of the verification application 121 ends.

If they do match, the verification application 121 moves from box 339 to box 342. In box 342, the verification application 121 stores an indication in the data store 115 (FIG. 1) that the communication address 136 has been verified. For example, the verification application 121 may associate the decrypted communication address 136 with the decrypted user identifier 142 (FIG. 1) in the data store 115. To this end, the communication address 136 may be added to the verified communication addresses 169 (FIG. 1) for the user. Alternatively, where the communication address 136 is already associated with the user identifier 142 in the data store 115, the verification application 121 may, for example, update a status in the data store 115 that indicates that the previously associated communication address 136 has been verified.

In one embodiment, the computing environment 103 may give the user access to some secured resource only after the user has verified the communication address 136. In such a case, a second factor authentication token may then be provided to the client 106 to provide access to the secured resource. In another embodiment, the address verification process may be used to confirm an on-line transaction. Thereafter, the portion of the verification application 121 ends.

Figure 4:
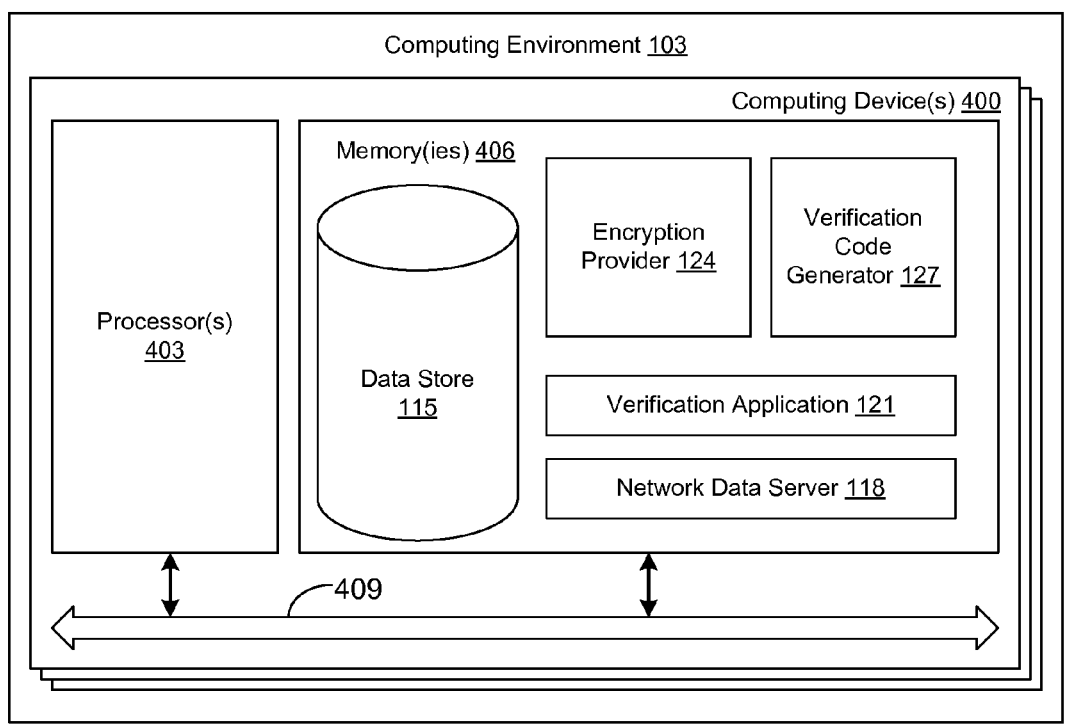
FIG. 4 is a schematic block diagram that provides one example illustration of a computing environment employed in the networked environment of FIG. 1 according to various embodiments of the present disclosure.

With reference to FIG. 4, shown is a schematic block diagram of the computing environment 103 according to an embodiment of the present disclosure. The computing environment 103 comprises one or more computing devices 400. The computing device 400 includes at least one processor circuit, for example, having a processor 403 and a memory 406, both of which are coupled to a local interface 409. To this end, the computing device 400 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the network data server 118, the verification application 121, the encryption provider 124, the verification code generator 127, and potentially other applications. Also stored in the memory 406 may be a data store 115 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the network data server 118, the verification application 121, the encryption provider 124, the verification code generator 127, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the verification application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network data server 118, the verification application 121, the encryption provider 124, and the verification code generator 127, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, comprising:
    code that authenticates a user, the user being at a client;
    code that determines a user identifier for the user in response to receiving a communication address from the client;
    code that generates encrypted verification data for the user, the encrypted verification data including the communication address, the user identifier, a first verification code, and a timestamp;
    code that generates a network page including a form, the form including the encrypted verification data in a hidden field;
    code that sends the network page to the client via a first communication protocol;
    code that transmits a second verification code to the communication address via a second communication protocol that differs from the first communication protocol;
    code that receives the encrypted verification data and the second verification code from the client by way of a submission of the form;
    code that, in response to receiving the encrypted verification data and the second verification code from the client by way of the submission of the form, verifies that the user has acquired the second verification code using the communication address by decrypting the received verification data, retrieving the included first verification code from the decrypted verification data, and observing that the retrieved first verification code matches the received second verification code; and wherein the first verification code is unavailable in unencrypted form outside of the at least one computing device, and wherein the program is configured not to persist the verification data or the second verification code in data storage, thereby effecting a stateless verification by the program that the user has access to the communication address.

2. The non-transitory computer-readable medium of claim 1, further comprising code that returns an error to the client in response to determining that the retrieved first verification code does not match the second verification code.

3. The non-transitory computer-readable medium of claim 1, further comprising code that returns an error to the client in response to determining that an age of a decrypted timestamp retrieved from the decrypted verification data is not less than a maximum threshold age.

4. The non-transitory computer-readable medium of claim 1, wherein an association of the communication address with the first verification code is not persisted in a memory of the at least one computing device.

5. A method, comprising:
generating, via at least one of one or more computing devices, encrypted verification data for a user, the encrypted verification data including a communication address, an identifier of the user, a first verification code, and a timestamp;
sending over a first communications protocol, from at least one of the one or more computing devices, the encrypted verification data to the user;
transmitting over a second communications protocol different from the first communications protocol, from at least one of the one or more computing devices, a second verification code to the communication address;
receiving, via at least one of the one or more computing devices, the encrypted verification data and the second verification code from the user;
verifying, via at least one of the one or more computing devices, that the user has acquired the second verification code using the communication address by decrypting the received verification data, retrieving the included first verification code from the decrypted verification data, and observing that the retrieved first verification code matches the received second verification code; and
wherein the first verification code is unavailable in unencrypted form outside of the one or more computing devices, and wherein the one or more computing devices are configured not to persist the verification data or the second verification code in data storage, thereby effecting a stateless verification by at least one of the one or more computing devices that the user has access to the communication address.

6. The method of claim 5, wherein verifying that the user has acquired the second verification code using the communication address further comprises:
retrieving, via at least one of the one or more computing devices, the included timestamp from the decrypted verification data; and
determining, via at least one of the one or more computing devices, that an age of the retrieved timestamp is less than a maximum threshold age.

7. The method of claim 5, further comprising authenticating, via at least one of the one or more computing devices, the user before sending the encrypted verification data to the user.

8. The method of claim 5, wherein generating the encrypted verification data further comprises encrypting, via at least one of the one or more computing devices, the encrypted verification data using a symmetric key.

9. The method of claim 5, further comprising:
receiving, via at least one of the one or more computing devices, the communication address from the user; and
wherein the encrypted verification data is generated in response to receiving the communication address from the user.

10. The method of claim 5, further comprising:
determining, via at least one of the one or more computing devices, whether the user has performed a maximum number of communication address verifications; and
wherein the encrypted verification data is generated further in response to determining that the user has not performed the maximum number of communication address verifications.

11. The method of claim 5, wherein sending over the first communications protocol the encrypted verification data to the user further comprises:
generating, via at least one of the one or more computing devices, a network page including a form, the form including the encrypted verification data in a prepopulated field, the form being configured to solicit the second verification code from the user;
sending, via at least one of the one or more computing devices, the network page to a client associated with the user; and
wherein the encrypted verification data and the second verification code are received from the user by way of the form.

12. The method of claim 5, wherein sending over the first communications protocol the encrypted verification data to the user further comprises:
setting, via at least one of the one or more computing devices, a cookie in a client associated with the user, the cookie including the encrypted verification data; and
wherein the encrypted verification data is received from the user by way of the cookie.

13. The method of claim 5, wherein the communication address is an email address, and transmitting over the second communications protocol different from the first communications protocol the second verification code to the communication address further comprises transmitting, via at least one of the one or more computing devices, the second verification code to the email address in an email message.

14. The method of claim 5, wherein the communication address is a telephone number, and transmitting over the second communications protocol different from the first communications protocol the second verification code to the communication address further comprises transmitting, via at least one of the one or more computing devices, the second verification code to the telephone number in a text message.

15. The method of claim 5, wherein the communication address is a telephone number, and transmitting over the second communications protocol different from the first communications protocol the second verification code to the communication address further comprises transmitting, via at least one of the one or more computing devices, the second verification code to the telephone number in a voice call.

16. The method of claim 5, wherein the communication address is a postal address, and transmitting over the second communications protocol different from the first communications protocol the second verification code to the communication address further comprises generating, via at least one of the one or more computing devices, postal correspondence to the postal address, and the postal correspondence includes the second verification code.

17. A system, comprising:
at least one computing device; and at least one application executable in the at least one computing device, the at least one application being configured to at least:

generate encrypted verification data including a first verification code and a communication address;

send the encrypted verification data to a client over a first communications protocol;

transmit a second verification code to the communication address over a second communications protocol different from the first communications protocol;

receive the encrypted verification data and the second verification code from the client;

verify that the client or a user at the client acquired the second verification code using the communication address by decrypting the received verification data, retrieving the included first verification code from the decrypted verification data, and observing that the retrieved first verification code matches the received second verification code; and wherein the first verification code is unavailable in unencrypted form outside of the at least one computing device, and wherein the at least one application is configured not to persist the verification data or the second verification code in data storage, thereby effecting a stateless verification by the at least one application that the client or the user at the client has access to the communication address.

18. The system of claim 17, wherein verifying that the client or the user at the client acquired the second verification code further comprises:

retrieving a timestamp from the decrypted verification data; and determining that an age of the retrieved timestamp is less than a maximum threshold age.

19. The system of claim 17, wherein the at least one application is further configured to generate the encrypted verification data in response to receiving the communication address from the user.

20. The system of claim 17, wherein the at least one application is further configured to store an indication that the communication address has been verified in a data store in response to verifying that the client or the user at the client acquired the second verification code using the communication address.

21. The system of claim 17, wherein the at least one application is further configured to receive the encrypted verification data from the client by way of a cookie set in the client by the at least one application.

22. The system of claim 17, wherein the at least one application is further configured to receive the encrypted verification data from the client by way of a form field that is pre-populated by the at least one application.

23. The system of claim 20, wherein storing the indication that the communication address has been verified in the data store further comprises associating the communication address with a user identifier.

24. The system of claim 20, wherein storing the indication that the communication address has been verified in the data store further comprises updating a status relative to a previously stored communication address in the data store.

\* \* \* \* \*